United States Patent
Srinivasan

(10) Patent No.: US 11,930,084 B2
(45) Date of Patent: Mar. 12, 2024

(54) MICROSERVICES BASED OPERATING SYSTEM

(71) Applicant: INTERNATIONAL BUSINESS MACHINES CORPORATION, Armonk, NY (US)

(72) Inventor: Balamurugan Srinivasan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 17/655,299

(22) Filed: Mar. 17, 2022

(65) Prior Publication Data

US 2023/0300206 A1    Sep. 21, 2023

(51) Int. Cl.
*H04L 67/51* (2022.01)
*H04L 41/0803* (2022.01)
*H04L 41/5041* (2022.01)
*H04L 67/133* (2022.01)

(52) U.S. Cl.
CPC .......... *H04L 67/51* (2022.05); *H04L 41/0803* (2013.01); *H04L 41/5041* (2013.01); *H04L 67/133* (2022.05)

(58) Field of Classification Search
None
See application file for complete search history.

(56) References Cited

U.S. PATENT DOCUMENTS

| | | |
|---|---|---|
| 2015/0012739 A1 | 1/2015 | Yang |
| 2016/0124742 A1* | 5/2016 | Rangasamy ............ H04L 41/00 717/103 |
| 2017/0134247 A1 | 5/2017 | Hoja |
| 2017/0374180 A1 | 12/2017 | Gowda |
| 2020/0366752 A1* | 11/2020 | White ................. G06F 11/3409 |
| 2021/0240551 A1* | 8/2021 | Joyce ..................... H04L 67/02 |
| 2023/0153825 A1* | 5/2023 | Srivastava ............ G06F 11/008 707/703 |
| 2023/0281068 A1* | 9/2023 | Friedrich ............ G06F 11/0778 714/57 |

FOREIGN PATENT DOCUMENTS

WO    2020060537 A1    3/2020

* cited by examiner

*Primary Examiner* — Atta Khan
(74) *Attorney, Agent, or Firm* — Teddi E. Maranzano

(57) ABSTRACT

A method, computer program product, and computer system are provided. A microservice formats a request to a process management microservice and to another microservice to perform an operation on behalf of the microservice. The process management microservice validates the requested operation. Based on the requested operation being valid, process management sends the requested operation to the other microservice. The process management microservice updates the microservices registry with a status of the microservice and the other microservice. The microservice and the other microservice update their respective local status registries.

14 Claims, 3 Drawing Sheets

MICROSERVICES BASED OPERATING SYSTEM

BACKGROUND

The present invention relates to computer systems, and more specifically to microservices based operating systems.

Currently, operating system components are tightly coupled which can make running multiple versions of applications or operating systems in an enterprise computer system challenging and costly. An upgrade to an application may require an upgrade to an operating system component, such as the Input/Output subsystem. However, the architecture of operating systems in current use does not provide for upgrading on a component basis only. As a consequence, an enterprise may risk delaying the operating system upgrade, or spend the time and financial resources when the risk is more than the enterprise can sustain.

It would be advantageous to provide an operating system based on a microservices architecture to improve systems availability, and more efficiently manage risk.

SUMMARY

A method is provided. A microservice formats a request to a process management microservice and to another microservice to perform an operation on behalf of the microservice. The process management microservice validates the requested operation. Based on the requested operation being valid, process management sends the requested operation to the other microservice. The process management microservice updates the microservices registry with a status of the microservice and the other microservice. The microservice and the other microservice update their respective local status registries.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Current implementations of a computer operating system (OS) are tightly coupled, meaning that the components are not only linked together, but are dependent upon each other for proper operation. An upgrade to an application may require an upgrade to an operating system component, such as the Input/Output subsystem. However, the tightly coupled architecture of current operating systems does not provide for upgrading on a component basis only. As a result, an enterprise needing to upgrade a critical application, such as for end of year accounting processing, that depends on an upgraded OS component may risk delaying the critical application upgrade until after the crucial time period has passed. Some enterprises choose to mitigate possible risk by adopting a virtualization or a container architecture. This permits the enterprise to install the new hardware/software environment on the same or different server. The enterprise can then test the new environment, and when ready, make the new environment the primary production environment. Unfortunately, this arrangement is costly. For example, the enterprise invests in the extra computer hardware and software to support the environment, whether that is separate servers, containers, or virtualization. The supplemented environment also requires specialized system administrators, and additional hardware and software licenses. As a consequence, an enterprise may risk delaying the operating system upgrade, or spend the time and financial resources when the risk is more than the enterprise can sustain. It should also be noted that the microservices based OS exploits unused processing cycles available as a result of performance improvements in today's hardware, RAM, and CPUs.

Embodiments of the present invention propose a solution to these issues by providing an operating system that is based on a microservices architecture.

A microservice architecture decomposes a tightly coupled or monolithic application into its individual services. Here, application refers to user software programs and the OS itself. The individual services are loosely coupled to deliver the same functionality as the corresponding tightly coupled application, but with additional advantages. For example, a microservice can be developed independently from other services, can have its own continuous integration/continuous development pipeline and can be scaled individually in production as needed. As a result, the application can evolve more quickly, and respond more quickly to changing requirements, as compared to the tightly coupled model, while at the same time being transparent to the end user. Additionally, the microservices based OS takes advantage of the extra capacity.

Figure 1:
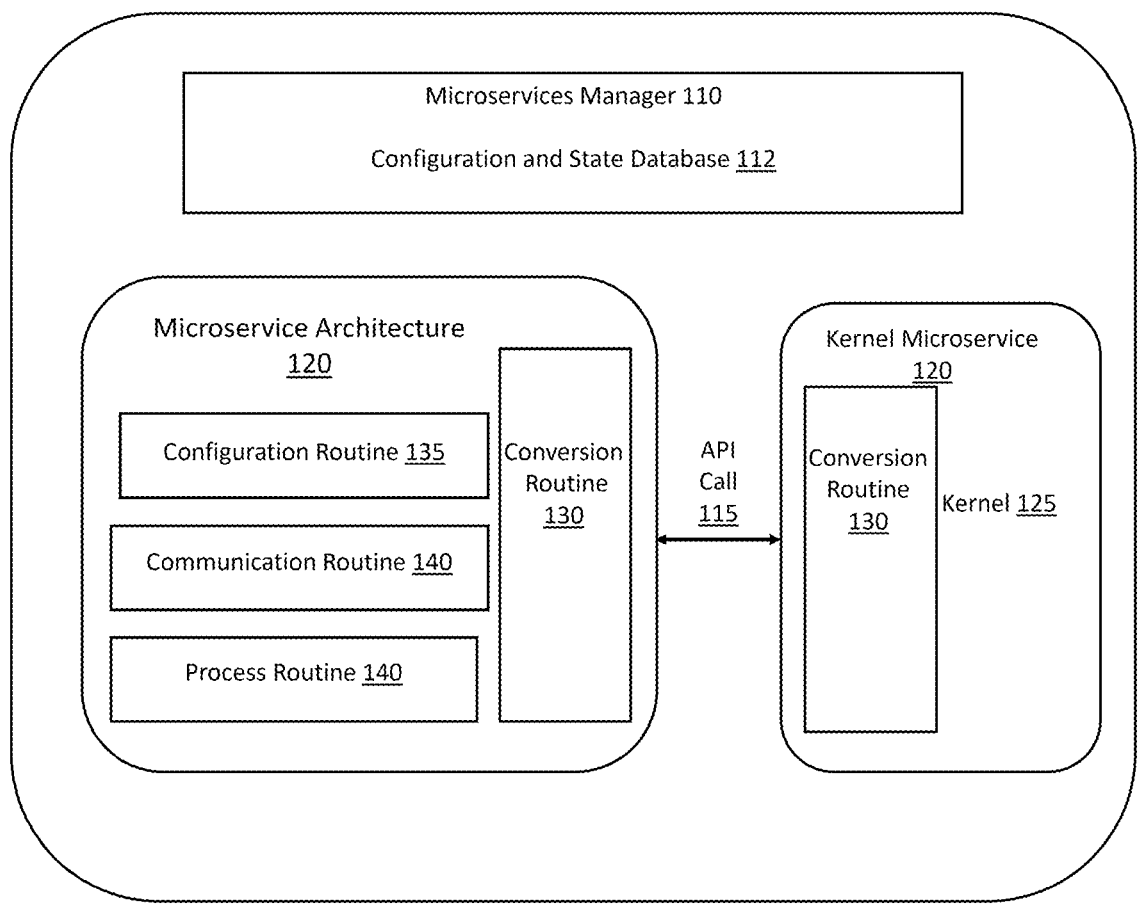
FIG. 1 illustrates a view of an architecture of a microservices architectur2, according to an embodiment of the present invention.

FIG. 1 illustrates a block diagram of a microservice 120. The flexibility provided through embodiments of the present invention is through the use of APIs 115 that connect each of the microservices 120. Each API 115 is analogous to the system call path between components in a tightly coupled OS, and taken together, the APIs 115 connect the microservices 120 to provide the function of an OS. The kernel 125 of FIG. 2 corresponds to the kernel microservice of FIG. 1.

The system call is made via API 115 to the conversion routine 130 in both the kernel 125 and the microservice 120. The conversion routine 130 verifies and performs any needed call conversion to ensure compatibility to the kernel 125, thereby removing dependency on a particular kernel architecture. The conversion routing 130 comprises a set of predefined rules based on that the conversion of information is carried out so that it can be processed by the microservice. For example, an application making a system call in a Windows based component will require conversion to the OS format of the system call in the destination component, such as Linux. The conversion is transparent to the application. The rules for conversion are defined based on microservice 120 and are applied to both the incoming and outgoing messages of a microservice 120. The converted messages ensure compatibility with other microservices 120 in the environment.

In this way, any change in the microservice 120 or the kernel 125 remain independent of each other. For example, if a new version of a user application requires an upgrade to an I/O microservice, the systems administrator can receive a notification from the microservices manager 110 of the incompatibility and take an action to upgrade the microservice 120. In this case, the systems administrator can upgrade only that microservice 120 without needing to upgrade the entire OS. This flexibility allows the systems administrator to run a combination of both a higher and a lower version of the microservice 120 until, for example, a service window for upgrading the rest of the OS is available. As another example, the systems administrator can decide to upgrade the kernel and a Security microservice to higher versions in response to a security vulnerability but deciding to maintain the older I/O microservice and file management microservice to accommodate the older applications without any issues in the newer kernel. As is comparable to a tightly coupled OS, during a component upgrade, the component will wait for activity to quiesce prior to continuing the upgrade. Similarly, as in a tightly coupled OS, locking and contention issues are managed by the process management 120 microservice, which can be considered analogous to an OS scheduler.

The microservices manager 110 is the services registry for all the microservices 120. The database 112, the centralized repository where the microservices 120 write their state data, is used by the kernel 125 to identify the state of microservices 120 that are the source or destination for messages. State includes whether a resource managed by the requested microservice is not available, e.g., locked or has contention, or has an error condition. Each microservice 120 stores its state data locally and in the database 112. The state data contained in the database 112 establishes a single source of truth.

A microservice 120 transmits instructions to another microservice 120 along with a context, i.e., the local state of the sending microservice 120, that is generated based on the contents of the instructions to be performed. The conversion routine 130 in the kernel 125 examines the context to determine whether to obtain a context state, service state, or both from the database 112 to perform the requested service. The micro service 120 updates its state locally, and in the database 112.

The database 112, shown with the microservices manager 110, can be isolated from the microservices 120 by deploying it in a separate container, making the database 112 scalable as usage requirements increase. The state data in the database 112 can be queried in real time and can be used to query the state of individual microservices 120 or the solution as a whole.

Each of the microservices 120 includes a configuration routine 135, a communication routine 140, and a process routine 140. The configuration routine 135 governs the configuration of the microservice 120, such as variable declaration, and how frequently the microservice 120 updates its state data in the database 112. The communication routine 135 defines the format of communications over the API 115. The process routine 140 executes the purpose of the particular microservice 120. The output of the process routine 140 is passed to the communication routine 135, which passes the output to the requesting microservice 120 via the conversion routine 130.

Figure 2:
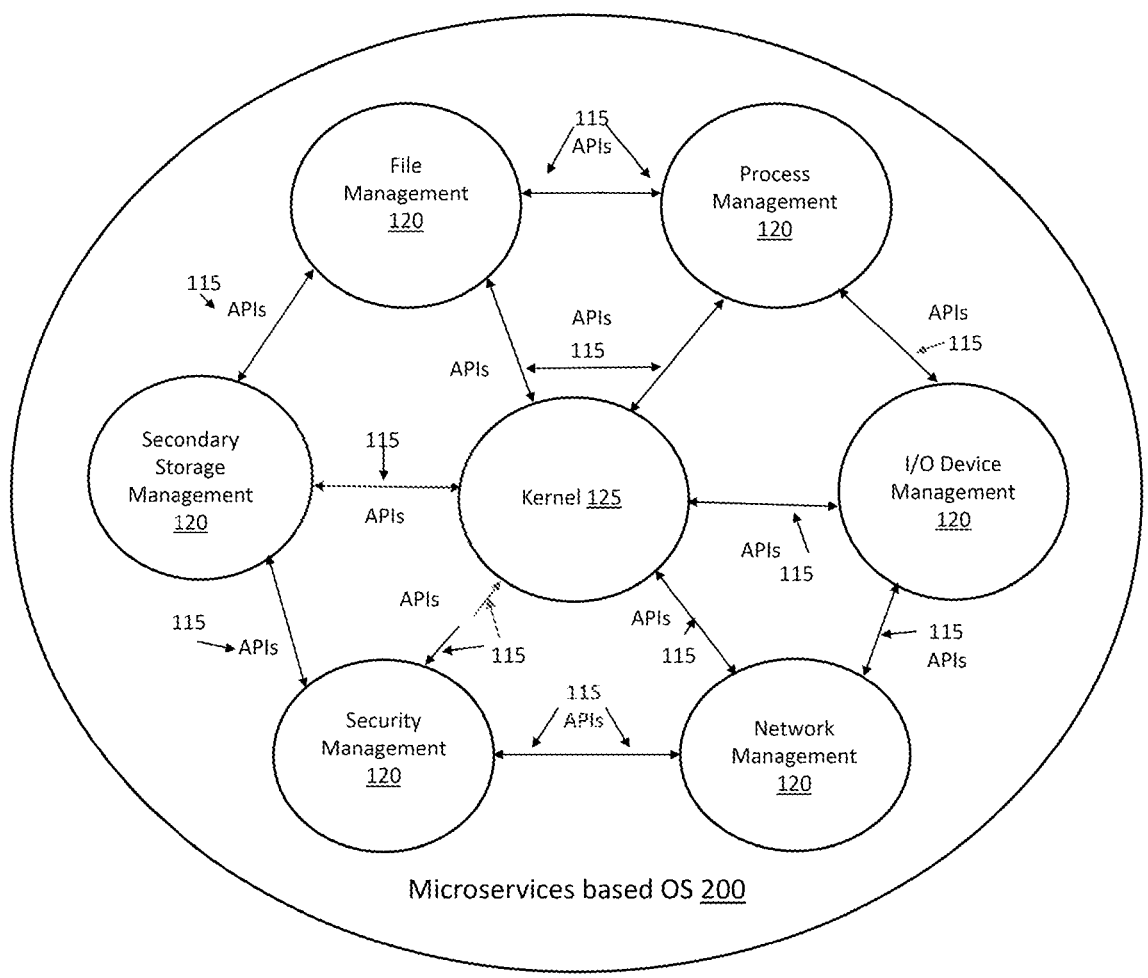
FIG. 2 is a functional block diagram of an architecture of a microservices based operating system, according to an embodiment of the present invention.

FIG. 2 illustrates a view of an OS architecture of a microservices based operating system 200. Each microservice 120 corresponds to a component of a tightly coupled OS and performs substantially the same function as the tightly coupled OS component to which it corresponds. Each microservice 120, consisting of computer-executable instructions to perform one or more specific services, is deployed based on a desired configuration that is selected from available hardware and OS components.

The API 115 comprises two separate bi-directional communications paths, a data path and a control plane. The data processed between the microservices 120 is transmitted over a data plane communication path. The data in the transmission depends on the architected requirements of the sending and destination microservices 120. For example, a request from the file management microservice 120 to an I/O device management microservice 120 to open a file can include the file pathname, the mode (e.g., read, write) for opening, and any other flags or parameters architected by the sending microservice 120 and the receiving microservice 120.

The control plane communication path supplies the management tools that are required to collect and visualize the performance metrics and dynamically execute configuration changes requested by a systems administrator, for example, from a central service manager. The control plane operations include identifying microservice 120 dependencies, requesting routing, requesting retries, and responding to timeouts.

Typically, each microservice 120 receives a configuration based on the environment/OS. As described above, an OS comprises several microservices 120 that cooperate to provide the functionality of the OS. The configuration and state database (database) 112 can store several versions of each individual microservice 120 grouped by architecture. For example, the database 112 can include several various versions of Windows microservices, such file management. Similarly, the database 112 can include various versions of Linux microservices.

Figure 3:
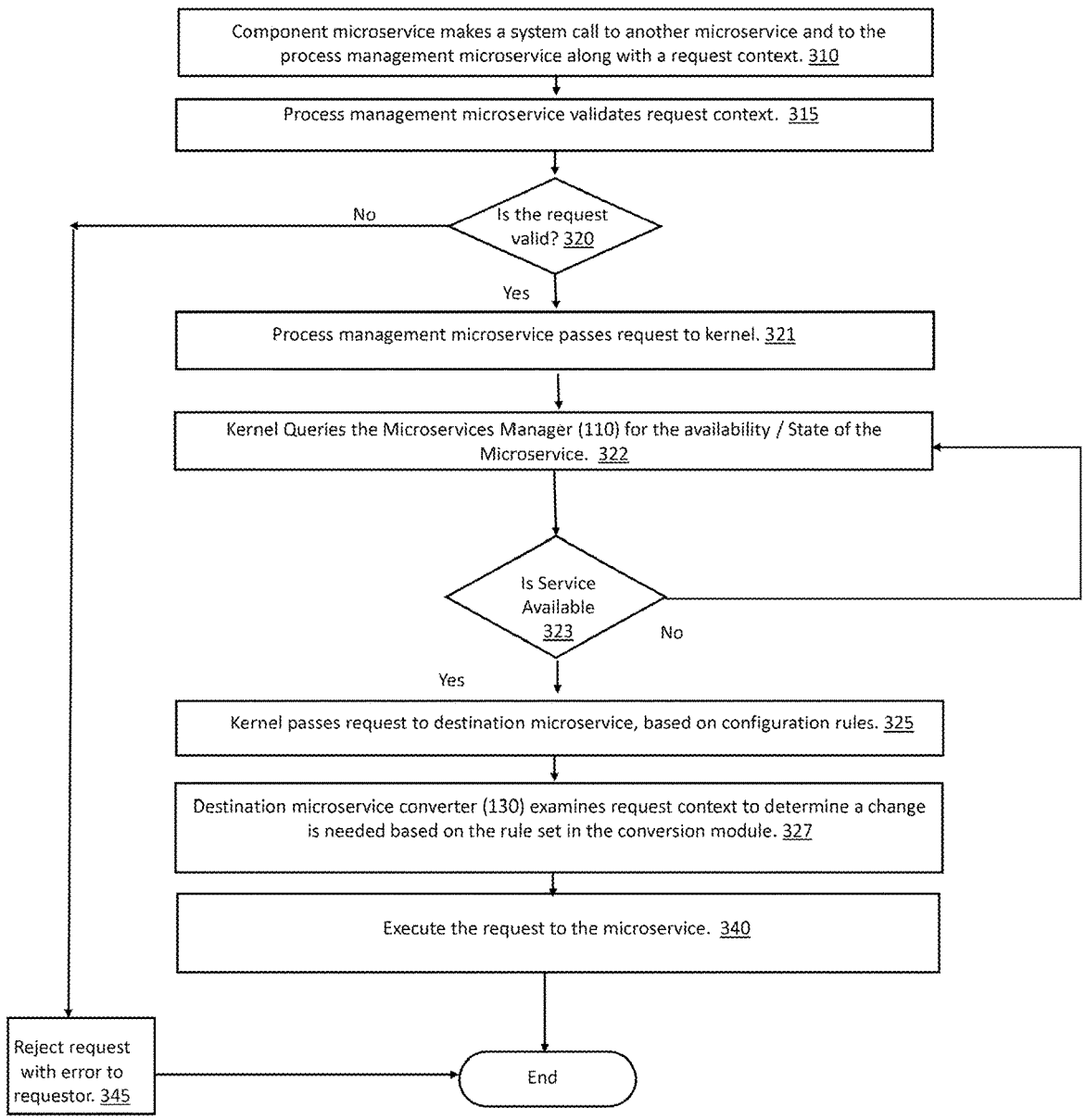
FIG. 3 illustrates a flow chart of an interaction between microservices, according to an embodiment of the present invention.

FIG. 3 illustrates a flow chart of an interaction between microservices 120.

At 310, a microservice 120 makes a system call to another microservice 120 and to the process management microservice 120, which includes the request context. Whenever the state of a microservice 120 changes, the state is written to the database 112. Before passing the process to the requested microservice 120, the kernel microservice 125 checks the availability of the requested microservice 120. If the requested microservice 120 is available, the kernel microservice 125 will dispatch it. Otherwise, the kernel microservice 125 places the requesting microservice 120 in a wait state until the requested microservice 120 is available. At 315, process management 120 validates the request context.

At 320, if the request context is valid, process management 120 passes the request to the kernel 125 (321). If the request context is not valid, then at 345 the request is rejected with an error to the requestor. At 322 the kernel 125 queries the microservices manager 110, which searches the database 112 for the availability and state of the microservice 120 that is the destination of the request. At 323, if the service is not available, processing returns to 322 to wait for the availability of the requested service. When the service is available, the kernel 125 passes the request to the destination microservice 120 over the API 115 corresponding to the destination microservice 120 (325). At 327, the converter 130 at the destination microservice examines the request context to determine if conversion is needed. At 340, the request is executed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram, or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A method, comprising:
   a microservice formatting a request to a process management microservice and to another microservice to perform an operation on behalf of the microservice;
   validating, by the process management microservice, the requested operation, wherein the validating comprises verifying in the microservices registry that a kernel version of the microservice is compatible with the another microservice and is available based on a state in a state database;
   based on the another microservice not being of a compatible kernel version of the microservice converting the requested operation by a converter module of the another microservice according to predefined configuration rules;
   based on the operation being valid, process management sending the requested operation to the another microservice; and
   updating a microservices registry with a status of the microservice and the another microservice;
   based on the another microservice not being of a compatible kernel version of the microservice converting the requested operation by a converter module of the another microservice according to predefined configuration rules.

2. The method of claim 1, where communication between microservices happens over a bidirectional API that corresponds in functionality to a system call in tightly coupled computer operating system.

3. The method of claim 1, wherein the microservices registry is a centralized database comprising:
   state data of each microservice, wherein the state data includes whether a resource managed by the microservice is available, has contention, or has an error condition.

4. The method of claim 3, wherein each microservice maintains a local registry of its state in addition to updating the microservices registry, and wherein the microservices registry is a single source of truth.

5. The method of claim 1, further comprising: a computer operating system, wherein the computer operating system comprises a plurality of microservices that are interconnected by a bidirectional API, and wherein each of the plurality of microservices corresponds to a component in the operating system, and wherein each of the plurality of microservices is dynamically and independently upgraded.

6. A computer program product, the computer program product comprising a non-transitory tangible storage device having program code embodied therewith, the program code executable by a processor of a computer to perform a method, the method comprising:
   a microservice formatting a request to a process management microservice and to another microservice to perform an operation;
   validating, by the process management microservice, the requested operation, wherein the validating comprises verifying in the microservices registry that a kernel version of the microservice is compatible with the another microservice and is available based on a state in a state database;
   based on the another microservice not being of a compatible kernel version of the microservice converting the requested operation by a converter module of the another microservice according to predefined configuration rules;
   based on the operation being valid, process management sending the requested operation to the another microservice; and
   updating a microservices registry with a status of the microservice and the another microservice.

7. The computer program product of claim 6, where communication between microservices happens over a bidirectional API that corresponds in functionality to a system call in tightly coupled computer operating system.

8. The computer program product of claim 6, wherein the microservices registry is a centralized database comprising:
   state data of each microservice, wherein the state data includes whether a resource managed by the microservice is available, has contention, or has an error condition.

9. The computer program product of claim 8, wherein each microservice maintains a local registry of its state in addition to updating the microservices registry, and wherein the microservices registry is a single source of truth.

10. The computer program product of claim 6, further comprising: a computer operating system, wherein the computer operating system comprises a plurality of microservices that are interconnected by a bidirectional API, and wherein each of the plurality of microservices corresponds to a component in the operating system, and wherein each of the plurality of microservices is dynamically and independently upgraded.

11. A computer system, comprising:
    one or more processors;
    a memory coupled to at least one of the processors;
    a set of computer program instructions stored in the memory and executed by at least one of the processors in order to perform actions of:
    a microservice formatting a request to a process management microservice and to another microservice to perform an operation;
    validating, by the process management microservice, the requested operation, wherein the validating comprises verifying in the microservices registry that a kernel version of the microservice is compatible with the another microservice and is available based on a state in a state database;
    based on the another microservice not being of a compatible kernel version of the microservice converting the requested operation by a converter module of the another microservice according to predefined configuration rules;
    based on the operation being valid, process management sending the requested operation to the another microservice; and
    updating a microservices registry with a status of the microservice and the another microservice.

12. The computer system of claim 11, where communication between microservices happens over a bidirectional API that corresponds in functionality to a system call in tightly coupled computer operating system.

13. The computer system of claim 11, wherein each microservice maintains a local registry of its state in addition to updating the microservices registry, and wherein the microservices registry is a single source of truth in the configuration.

14. The computer system of claim 11, further comprising: a computer operating system, wherein the computer operating system comprises a plurality of microservices that are interconnected by a bidirectional API, and wherein each of the plurality of microservices corresponds to a component in the operating system, and wherein each of the plurality of microservices is dynamically and independently upgraded.

* * * * *